United States Patent

Montagu

[11] Patent Number: 5,936,324
[45] Date of Patent: Aug. 10, 1999

[54] MOVING MAGNET SCANNER

[75] Inventor: Jean I. Montagu, Brookline, Mass.

[73] Assignee: Genetic MicroSystems Inc., Woburn, Mass.

[21] Appl. No.: 09/050,496

[22] Filed: Mar. 30, 1998

[51] Int. Cl.[6] .................................. H02K 21/12
[52] U.S. Cl. ........................................... 310/156
[58] Field of Search ........................ 310/154–156, 310/90–91

[56] References Cited

U.S. PATENT DOCUMENTS

| | | | |
|---|---|---|---|
| 4,076,998 | 2/1978 | Montagu | 318/132 |
| 4,433,261 | 2/1984 | Nashiki et al. | 310/156 |
| 4,465,950 | 8/1984 | Guttinger | 310/162 |
| 4,473,764 | 9/1984 | White | 310/91 |
| 4,866,324 | 9/1989 | Yuzawa et al. | 310/268 |
| 5,121,020 | 6/1992 | Bertram et al. | 310/156 |
| 5,313,127 | 5/1994 | Danley et al. | 310/36 |
| 5,424,632 | 6/1995 | Montagu | 324/146 |
| 5,528,095 | 6/1996 | Strobl | 310/156 |
| 5,627,423 | 5/1997 | Marioni | 310/156 |
| 5,710,474 | 1/1998 | Mulgrave | 310/254 |

*Primary Examiner*—Nestor Ramirez
*Assistant Examiner*—Joseph Waks
*Attorney, Agent, or Firm*—Fish & Richardson P.C.

[57] ABSTRACT

A limited excursion permanent magnet motor in which the permanent magnet, captured between axially loaded bearings, is connected in a space-economizing construction to the output shaft of the motor by a torque-transmitting keyed construction.

10 Claims, 4 Drawing Sheets

MOVING MAGNET SCANNER

The availability of high energy, rare earth permanent magnets has stimulated designs of higher performance motors. A typical motor has a set of stationary coils and a rotating magnet. Optical scanners, a subset of this type of motor, are differentiated by the fact that they exhibit only limited rotation capability and require an extremely high torque-to-inertia ratio. They also need to have a very rigid shaft as the shaft behaves as a torsion spring with respect to the load. The first resonance of the rotor-shaft-load assembly limits the frequency of oscillation that can be controlled.

One of the difficulties encountered with achieving desired high levels of performance is the need for a suitable anchor of the output shaft to the permanent magnet rotor. Typical permanent magnet rotors have been built with the shaft bonded inside a hole pierced in the center of the magnet. This construction does not lend itself to a desirably large diameter shaft, as such a shaft would subtract a large fraction of the space allocated for the magnet and lower the overall performance.

Early constructions such as exemplified by Montagu U.S. Pat. No. 4,076,998 had the output shaft butt-bonded or soldered to the end of a permanent magnet. The bond to rare earth magnetic material is unreliable as the thermal expansion is highly dependent upon the direction of magnetization of the material. A high torque device heats and cools over a range as large as 100 degrees Centigrade, resulting in strains in the bond and rupture in fatigue mode. Danley U.S. Pat. No. 5,313,127 and Montagu U.S. Pat. No. 5,424,632 offered solutions to this particular shortcoming but the mounting structure decreased the available volume for the magnet in order to attach both output shafts. Such constructions may have minor consequence when the magnet is very large, but when the moment of inertia of the rotary, oscillating assembly must be small, as needed for very high-speed devices, the structures of U.S. Pat Nos. 5,313,127 and 5,424,632 limit the relative, effective volume available for the magnet, which can significantly limit the achievable performance.

SUMMARY OF THE INVENTION

According to the invention, a limited excursion motor is provided comprising a moving permanent magnet rotor, supporting shafts at each end of the magnet and a stator having a coil in inter-acting relationship with the rotor, at least one end portion of the magnet being connected in cooperating torque-transmitting relationship to an end portion of the respective shaft by at least one protrusion extending from one of the cooperating end portions axially into a receiving aperture in the other of the cooperating end portions.

Preferred embodiments of the invention include one or more of the following features.

The limited excursion motor has each of the end portions of the magnet connected in torque-transmitting cooperating relationship to a corresponding end of the respective shaft in the manner described.

A spring axially biases the cooperating end portions together, preferably the shafts of the rotor are supported by bearings, and the spring is also arranged to axially pre-load the bearings.

An elongated slot is formed in an axially directed surface of one of the cooperating end portions of the motor and shaft and the protrusion is correspondingly elongated to fit into the slot, preferably the slot being a diametral slot.

In some embodiments the slot is formed in each of the cooperating end portions and a key in one of the slots serves as the protrusion engaged in the slot of the other end portion.

In other embodiments the slot is formed in only one of the cooperating end portions and a protrusion integral with the other cooperating end portion extends into the slot.

The edges of cooperating end portions of the magnet and shaft are cooperatively shaped to interfit.

The permanent magnet comprises permanent magnetic material having field strength of the order of Nedymium Iron Boron.

The motor, in the form of a high speed permanent magnet scanner has both shafts joined to the permanent magnet with respective keys fitted into slots in the respective end portions of the magnet and the shafts.

The rare earth permanent magnet rotor/shaft construction of this invention is applicable to galvanometers or limited angular excursion motors. The invention offers maximum advantage to the construction of high torque or high-speed devices where torque delivery causes high torsional stress to the interface between the output shaft and the magnet and where other forces are modest. This novel construction preload preserves the integrity of the armature at high acceleration. In the preferred construction, axial preload of the bearings also cooperates to press the armature elements together.

The keyed construction permits an extremely high torque output without bond fatigue as experienced with many previous designs. A major feature of this invention is the ability to create a reliable high torque transmission mechanism that is independent from the uncertainties of epoxy or similar bonding agents under tension or shear. This is especially critical where high performance is required while large temperature variations occur between commencement of operation and shut down.

Another important feature of this invention is the low manufacturing cost compared to cost of prior art designs. Previous designs adapt to the weakness of the bond by employing a very large bonding area. The resultant deep cavity plus the need for vent holes and, following assembly, the grinding of excess material, raises the manufacturing cost of the armature.

The invention does not require material removal from the outside diameter of the armature. Grinding may be employed to ensure proper alignment of the bearing mounting surfaces if assembly fixturing is inadequate.

BRIEF DESCRIPTION OF THE DRAWINGS

FIG. 2 presents an exploded perspective view of an armature with both end shafts and the keys, while

DESCRIPTION OF THE PREFERRED EMBODIMENT

Figure 1:
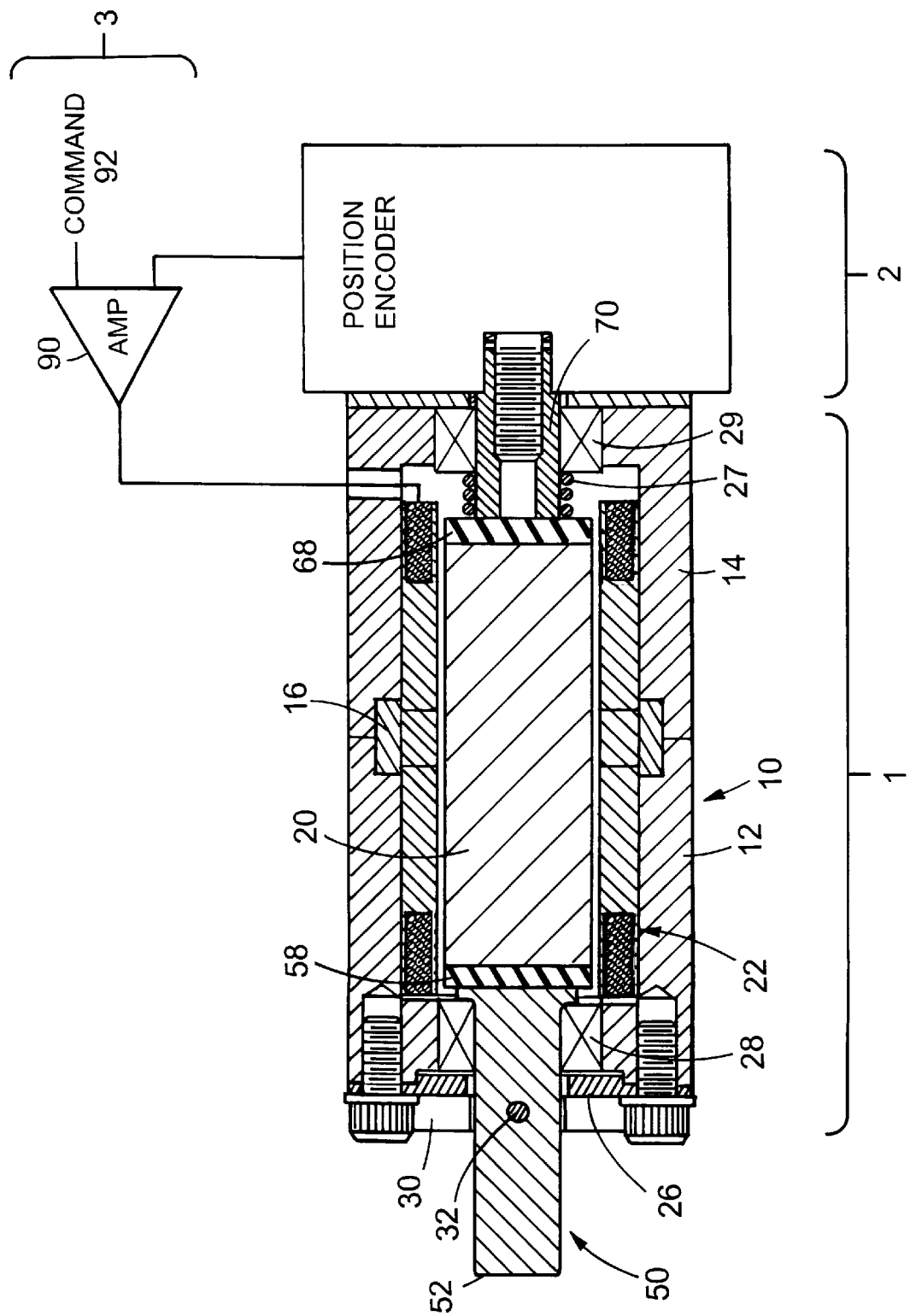
FIG. 1 shows a cross section of a typical closed loop servo optical scanner with its major components.

FIG. 1 shows the elements of a moving magnet scanner, or galvanometer: the torque motor 1 comprised of rotor 50 and stator 10, position encoder 2, and electronic servo control 3.

Stator 10 has an outer sleeve which forms part of the magnetic circuit which incorporates magnet 20 of the rotor and the fixed drive coil 22. The outer sleeve of stator 10 is made of two nearly identical halves 12 and 14 which are pressed or fastened upon central ring 16 to form a solid cylindrical structure. Outer sleeve parts 12 and 14 and ring 16 are of magnetically permeable material. At the out put end of the motor is a retainer 26 which holds the front bearing 28 and also captures the stationary part of limit stops 30 typically made of compliant material.

Figure 2:
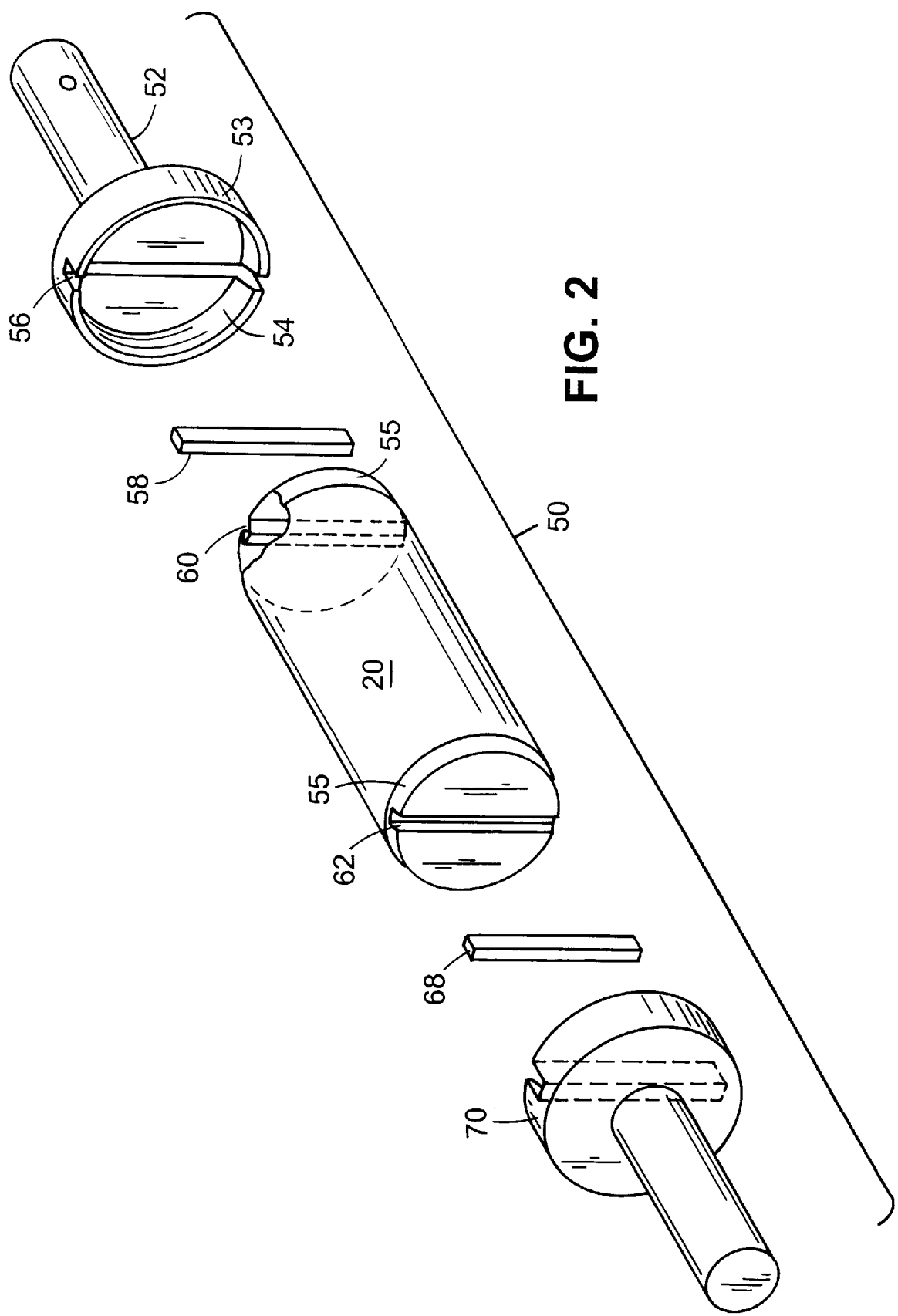

Referring also to FIG. 2, armature 50, captured between fixed bearings 28 and 29, comprises output shaft 52, permanent magnet 20, and rear shaft 70 as well as keys 58 and 68. The keys are shown in this embodiment as discrete, diametral keys, which relate the magnet to the shafts in the manner to be described. All of the elements of armature 50 are bonded together with epoxy such as Loctite 609 or similar bonding material and are held compressed together by compression spring 27. Compression spring 27, which bears on the moveable race of bearing 28 also defines the axial preload pressure for bearings 28 and 29. (Bearings manufacturer New Hampshire Ball Bearings recommends that its bearing number DDRI-814 which has ½ inch outside diameter and ¼ inch inside diameter have a preload of approximately one pound, a loading found to be quite appropriate for also compressing the armature construction being described).

In the system described only torsional efforts cause high stresses and these are transmitted between the magnet 20 and the front or rear shafts 52, 70 through keys 58 and 68. Keys and key slots formed in the magnet and the shafts may have clearance necessary for alignment or bonding agent. The large area of the slots and the fact that the material in the slots transmits torque only when in compression guaranties that the stresses experienced by these elements can always be held much below any failure point in fatigue.

Output shaft 52 of armature 50 is shaped to engage bearing 28 and hold the mobile half 32 of the limit stop, a pin not shown here, which is provided to cooperate with the stationary limit stop component to limit rotation of the armature. The pin of the limit stop is preferably of nonmagnetic material such as a 300 series stainless steel.

Figure 2A:
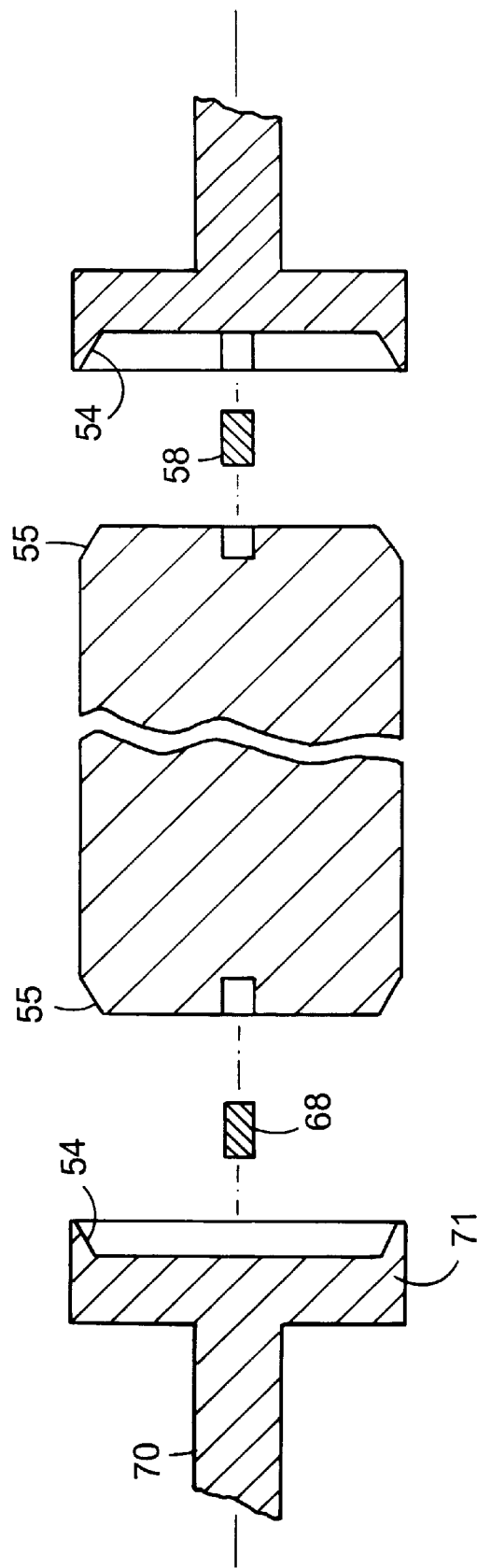
FIG. 2a is a cross-sectional view taken on line 2–2a of FIG. 2.

With reference to FIG. 2 and FIG. 2A, output shaft 52 has an enlarged end portion 53 shaped to interfit with the outer diameter of permanent magnet 20, shaft portion 53 being coupled to magnet 20 via its tapered (conical) alignment feature 54 and a corresponding tapered feature 55 on the end of magnet 20. Key slot 56 in shaft portion 53 accepts key 58 as does key slot 60 in permanent magnet 20. A similar end formation 71 on rear shaft 70 and the corresponding end of magnet 20 are similarly shaped at 54 and 55 to interfit and to receive key 68.

Keys 58 and 68 are preferably of material with coefficient of thermal expansion similar to that of the permanent magnet material as defined by the slot cut. Magnet materials such as Neodymium Iron Boron have thermal expansion of approximately 10 10E-6 m/m/degC, for which a key of stainless steel or titanium is suitable.

Position encoder 2 is preferably a variable capacitor type encoder with movable ceramic butterfly or an Inductosyn or an optical sensor or any other type with suitable signal-to-noise ratio and necessary bandwidth.

Coil 22 of the motor is preferably fabricated flat and later formed to fit the space between the armature and the inner surface of sleeves 12 and 14. Servo amplifier 90 forces the armature to obey command 92.

In FIG. 2 it can be seen that the keys 58 and 68 do not subtract appreciably from the volume of the magnet and thus enable a large torque to be achieved for a given rotor diameter. Likewise, the enlarged shaft ends and the keys have a favorable moment of inertia when compared to prior suggestions for securing the shaft to the magnet.

Figure 3:
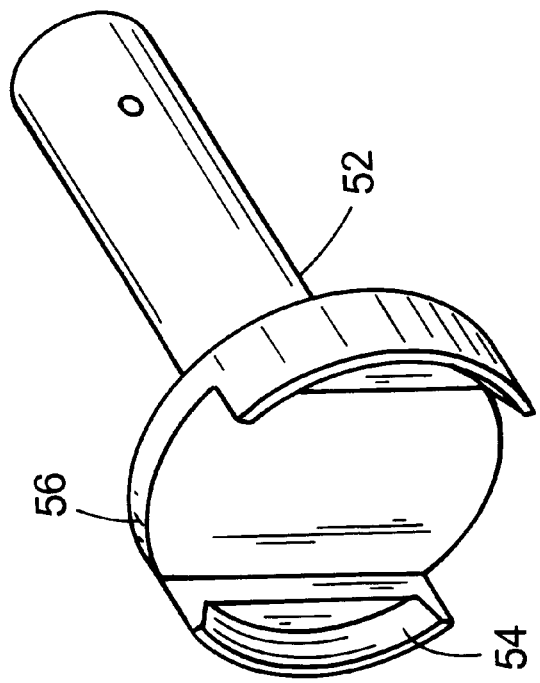
FIG. 3 shows an alternate construction where the key is part of the magnet.
Figure 3:
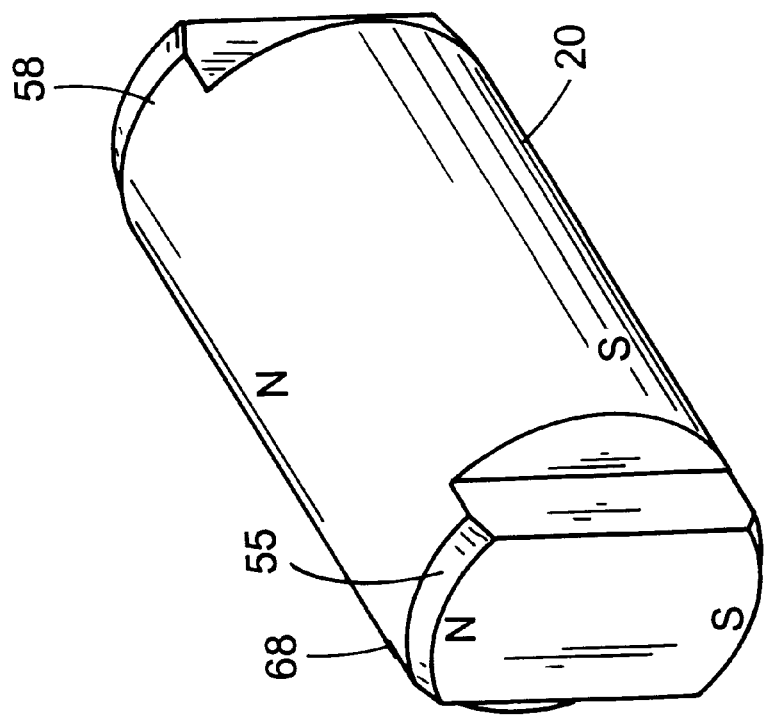

FIG. 3 is an alternate construction in which the key is an integral part of the magnet. The male part of the key is created by removing material from the edge of the magnet. The female part of the key is a simple slot. It is evident that the material removed from the magnet is located in a region which contributes minimally to the torque.

It is also evident that the male part of the key could be an integral part of the shaft and the slot be located within the magnet, that keys having orientation different from the illustrated diametral orientation could be employed, or multiple keys, such as an end spline arrangement or a circular array of interfit axial pins could be employed within the broader aspects of the present contribution.

The art will recognize other variations and modifications of the details of construction described here, while taking advantage of the principles of the invention.

What is claimed is:

1. A limited excursion motor comprising a moving permanent magnet rotor, said rotor including a permanent magnet having first and second ends, first and second supporting shafts cooperating with said first and second magnet ends, respectively, and a stator having a coil in an inter-acting relationship with the rotor, wherein at least said first supporting shaft is connected in a cooperating torque-transmitting relationship to said first magnet end by a first protrusion extending from either said first shaft axially into a receiving first aperture in said first magnet end or from said first magnet end into a receiving first aperture in said first shaft, and further comprising a first spring axially biasing said first supporting shaft and said first magnet end together.

2. The limited excursion motor of claim 1 wherein said second shaft is connected in a torque-transmitting cooperating relationship to said second magnet end by a second protrusion extending from either said second shaft axially into a receiving second aperture in said second magnet end or from said second magnet end into a second receiving aperture in said second shaft, and further comprising a second spring axially biasing said second supporting shaft and said second magnet end together.

3. The motor of claim 1 or 2 in which said first and second supporting shafts are supported by first and second bearings, respectively, and said first and second springs are arranged to also axially pre-load said first and second bearings, respectively.

4. The motor of claim 1 or 2 in which said first receiving aperture comprises an elongated slot and said first protrusion is correspondingly elongated to fit into the slot.

5. The motor of claim 4 in which the slot is a diametral slot.

6. The motor of claim 1 in which the permanent magnet comprises Neodymium Iron Boron.

7. A high speed permanent magnet scanner in the form of a limited excursion motor comprising a moving permanent magnet rotor, said rotor including a permanent magnet having first and second ends, first and second supporting shafts cooperating with said first and second magnet ends, respectively, and a stator having a coil in an inter-acting relationship with the rotor, wherein at least said first supporting shaft is connected in a cooperating torque-transmitting relationship to said first magnet end by a first protrusion extending from either said first shaft axially into a receiving first aperture in said first magnet end or from said first magnet end into a receiving, first aperture in said first shaft, and further comprising a first spring axially biasing said first supporting shaft and said first magnet end together.

8. A limited excursion motor comprising a moving permanent magnet rotor, said rotor including a solid imperforate magnet having first and second ends, each of said ends having at least one integral protrusion, first and second supporting shafts connected in a cooperating torque-transmitting relationship with said first and second magnet ends, respectively, by each said shaft having at least one aperture formed therein and configured to interfit with said at least one protrusion of said first and second ends, respectively, first and second springs axially biasing said first and second supporting shafts with said first and second magnet ends together, respectively, and a stator having a coil in inter-acting relationship with the rotor.

9. The motor of claim 8 wherein outside edges of said magnet ends and outside edges of their respective said supporting shafts are shaped to interfit with each other.

10. A limited excursion motor comprising a moving permanent magnet rotor, said rotor including a solid imperforate magnet having first and second ends, each end having at least one slot formed therein, first and second supporting shafts connected in a cooperating torque-transmitting relationship with said first and second magnet ends, respectively, each of said shafts having at least one slot formed therein, first and second keys positioned to engage and fit into said slots formed in first and second magnet ends and first and second supporting shafts, respectively, first and second springs axially biasing said first and second supporting shafts with said first and second magnet ends together, respectively, and a stator having a coil in inter-acting relationship with the rotor.

\* \* \* \* \*